US 6,595,598 B2

(12) United States Patent
Harris et al.

(10) Patent No.: US 6,595,598 B2
(45) Date of Patent: Jul. 22, 2003

(54) PUMP MOTOR CONTROL IN ELECTRO-HYDRAULIC BRAKING SYSTEMS

(75) Inventors: Alan Leslie Harris, Coventry (GB); Andrew Kingston, Heidesheim (DE)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 10/113,799

(22) Filed: Apr. 1, 2002

(65) Prior Publication Data

US 2002/0130549 A1 Sep. 19, 2002

Related U.S. Application Data

(63) Continuation of application No. 09/448,122, filed on Nov. 24, 1999.

(30) Foreign Application Priority Data

Nov. 27, 1998 (GB) .............................. 9825887

(51) Int. Cl.⁷ .............................. B60T 13/18; B60T 8/34
(52) U.S. Cl. .................... 303/11; 303/113.1; 303/116.1
(58) Field of Search ................... 303/10, 11, 113.1, 303/115.1, 116.1, 115.4

(56) References Cited

U.S. PATENT DOCUMENTS

| 4,266,192 A | * | 5/1981 | Ohtani ........................ 324/168 |
|---|---|---|---|
| 4,645,026 A | | 2/1987 | Adams |
| 4,656,833 A | | 4/1987 | Belart |
| 4,775,191 A | | 10/1988 | Roger et al. |
| 4,880,282 A | | 11/1989 | Makino et al. |
| 4,975,852 A | | 12/1990 | Fennel et al. |
| 5,152,585 A | | 10/1992 | Patient et al. .................. 303/10 |
| 5,188,440 A | | 2/1993 | Muller et al. |
| 5,297,857 A | | 3/1994 | Casey et al. |
| 5,447,363 A | | 9/1995 | Fukamachi .................. 303/125 |
| 5,454,632 A | * | 10/1995 | Burgdorf et al. ............... 303/11 |
| 5,487,593 A | | 1/1996 | Potts et al. ..................... 303/11 |
| 5,522,650 A | | 6/1996 | Negrin et al. |
| 5,791,745 A | | 8/1998 | Sakakibara ................... 303/11 |
| 5,941,608 A | | 8/1999 | Campau et al. ........... 303/115.4 |
| 5,979,999 A | | 11/1999 | Poertzgen et al. ........ 303/116.1 |
| 6,095,620 A | | 8/2000 | Dillard et al. ................. 303/11 |
| 6,113,197 A | | 9/2000 | Kuroki et al. ................. 303/11 |
| 6,123,395 A | | 9/2000 | Wolf et al. |
| 6,158,825 A | | 12/2000 | Schunck et al. ......... 303/115.4 |
| 6,318,817 B1 | * | 11/2001 | Martin et al. ............ 303/116.1 |

FOREIGN PATENT DOCUMENTS

| DE | 38 18 260 C2 | 7/1989 |
|---|---|---|
| DE | 19527706 | 1/1997 |
| DE | 19548248 | 6/1997 |
| WO | 97/39931 | 10/1997 |

\* cited by examiner

*Primary Examiner*—Jack Lavinder
*Assistant Examiner*—Thomas J. Williams
(74) *Attorney, Agent, or Firm*—MacMillan, Sobanski & Todd, LLC

(57) ABSTRACT

A vehicle braking system of the type in which a stored volume of fluid is used to apply the wheel brakes of the vehicle under the control of an electronic unit, the stored volume being held in an accumulator arranged to be replenished by pumping additional working fluid using a pump driven by an electric motor. The speed of the pump electric motor is arranged to be controlled in dependence upon whether or not any vehicle dynamic intervention, such as ABS, TC and VSC, is active. If it is deduced that one or more vehicle dynamic functions is active, then the pump is arranged to be run at high/full, and relatively noisy, speed, but if it is concluded that only base braking is being applied with no vehicle dynamic function being active, then the pump is arranged to be operated at a relative slower and hence quieter speed.

6 Claims, 4 Drawing Sheets

Note: This sequence is executed once per ECU cycle, with the motor-speed and supercharge flags being read and actioned in the external loop.

PUMP MOTOR CONTROL IN ELECTRO-HYDRAULIC BRAKING SYSTEMS

CROSS-REFERENCE TO RELATED APPLICATIONS

This application claims priority to co-pending United Kingdom Patent Application No. 9825887.4 and is a continuation of co-pending U.S. patent application Ser. No. 09/448,122 filed Nov. 24, 1999.

BACKGROUND OF THE INVENTION

The present invention relates to electro-hydraulic braking systems and is concerned in particular with a method for controlling the speed of a pump motor within a pump supplying such a braking system.

Electro-hydraulic braking systems for motor vehicles are known which comprise a brake pedal, a braking device connected to at least one vehicle wheel which is capable of being brought into communication with an electronically controlled valve arrangement in order to apply hydraulic fluid under pressure to the braking device, a hydraulic pump driven by an electric motor, and a high pressure hydraulic pressure accumulator fed by said pump for the provision of hydraulic fluid under pressure which can be passed to the braking device via the electronically controlled valve arrangement in order to apply hydraulic fluid under pressure to the braking device in so called "brake by wire" mode in proportion to the driver's braking demand as sensed at the brake pedal.

The known systems are commonly controlled by an electronic control unit (ECU) which performs high-level algorithms which control vehicle dynamic intervention functions, such as ABS, Traction Control TC and Vehicle Stability Control VSC. The electronic control unit controls among others the hydraulic pump to keep the pressure in the hydraulic pressure accumulator within specified limits.

When the brakes are actuated, and particularly when vehicle dynamic intervention is active, the pressure in the hydraulic pressure reservoir falls and must be increased by running the hydraulic pump. The rate at which the pump has to be run is dependent on the fluid consumption of the system, which is dependent on the vehicle dynamic functions (ABS, TC, VSC and the like) active at the time. However, the hydraulic pump used to pump up the high pressure accumulator is noisy and the noise increases with the speed at which it is run.

The known systems have the following disadvantage.

Pump flow rates needed during normal braking scenarios are relatively low because the time interval between successive brake applications allows the accumulator to be recharged slowly. However, the pump must sometimes deliver high flow rates at low motor voltage (9v) in order to satisfy the requirements of vehicle dynamics systems such as ABS, and this determines the size of the pump and motor. As a consequence the pump is too noisy when the supply voltage is in the normal (13v) range because the operating speed, and therefore also delivery flow, increases further.

This excessive pump noise is also unnecessarily generated in the known systems when the brakes are repeatedly "pumped" with the vehicle stationary, e.g. during "showroom" assessments.

It is an object of the present invention to reduce the incidence of excessive pump noise in situations where high pump speeds are not really necessary.

In accordance with the present invention there is provided a vehicle braking system of the type in which a stored volume of a fluid is used to apply the wheel brakes of the vehicle under the control of an electronic control unit, the stored volume being held in an accumulator arranged to be replenished by pumping additional working fluid using a pump driven by an electric motor, wherein the speed of the pump electric motor is arranged to be controlled in dependence upon whether or not any vehicle dynamic intervention, such as ABS, TC and VSC, is active.

If it is deduced that one or more vehicle dynamic functions is active then the pump can be run at high/full, and relatively noisy, speed. On the other hand, if it is concluded that only base braking is being applied with no vehicle dynamic function being active, then the pump can be arranged to be operated at a relatively slower and hence quieter speed.

A preferred feature of the present invention is to provide a system for controlling the hydraulic pump motor such that it is run at full speed only when the reservoir pressure is substantially reduced and the vehicle is moving or at any time when demand is increased by the activation of vehicle dynamic intervention.

A specific embodiment of a braking system according to the present invention will now be described, by way of example only, with reference to the accompanying drawings.

DETAILED DESCRIPTION OF THE INVENTION

Figure 1:
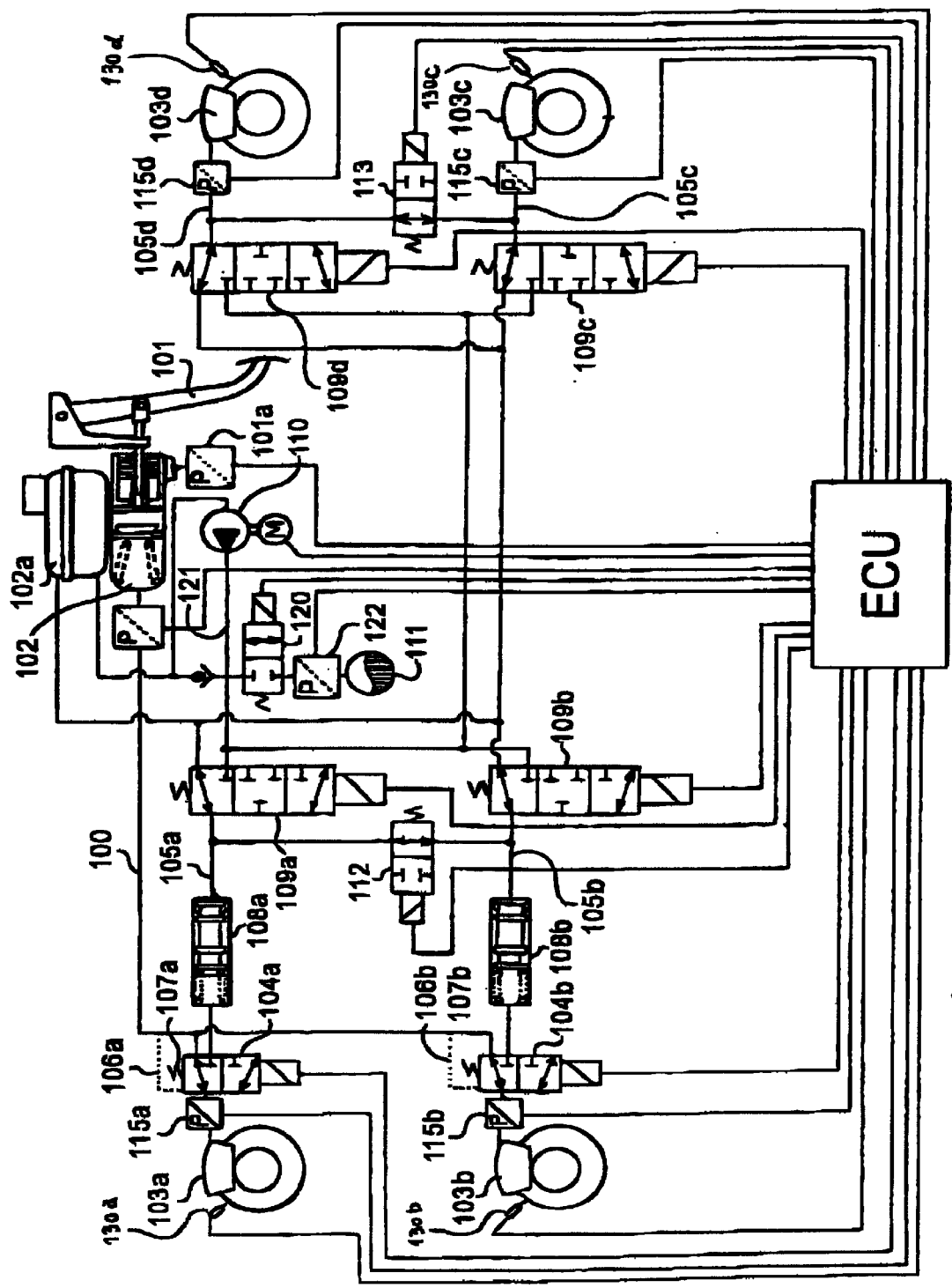
FIG. 1 is a schematic diagram of a vehicle braking system embodying the present invention.

The braking system shown in FIG. 1 includes a brake pedal 101 with an associated sensor 101a for the acquisition of the driver's braking demand. The driver's demand is transferred to an electronic control unit (ECU), evaluated there, and used as the source for the generation of electrical control signals for actuating valves 109, described further hereinafter, a hydraulic pump 110, wheel brakes 103a, 103b of one axle supplied with hydraulic fluid by electrically actuated brake channels 105a, 105b and wheel brakes 103c, 103d of the other axle supplied by electrically actuated channels 105c, 105d.

Under normal braking conditions, brake pressure modulation in the electrically actuated brake channels 105a, 105b, 105c, 105d is effected in a known manner by means of control valves 109a, 109b, 109c 109d, the brake pressure being provided by a pressure accumulator/reservoir 111 whose pressure is maintained by the pump 110 operated by an electric motor.

The electronic control unit (ECU) controls the hydraulic pump 110 with reference to a signal from a sensor 122 which indicates the pressure within the pressure reservoir 111. Also the electronic control unit (ECU) controls vehicle dynamic intervention functions by controlling the braking pressure at each of the wheel brakes 103a, 103b, 103c, 103d among others in dependence upon the rotational wheel behaviour sensed via sensor means 130a, 130b, 130c, 130d. During base braking, the pressures across each axle, i.e. at 103a and 103b and at 103c and 103d respectively are the same.

However, when vehicle dynamic intervention (for example, ABS, TC, VSC and the like) is active then the pressures at the wheel-brakes 103a, 103b, 103c, 103d are controlled separately.

The system described thus far is conventional and operates in accordance with well-known techniques. Under certain conditions, the system of FIG. 1 is arranged to operate differently from conventional systems (as described hereinafter) and for this purpose has a number of differences which are now described.

A shut-off valve 120 is arranged between the hydraulic pump 110 and the hydraulic pressure reservoir 111, and is designed as a ball valve. The motor pump unit can, as a result, be used for direct pressure modulation of the brakes 103 instead of or in support of the pressure reservoir 111.

The pressure in the pressure reservoir 111 is monitored by a sensor 122. If the pressure falls below a first predetermined low-pressure threshold "cut-in pressure" then the shut-off valve 120 is opened and the pump 110 is activated in order to recharge the pressure reservoir. In the event of brake actuation being necessary during the recharging process, the shut-off valve 120 provides the possibility of the pressure reservoir 111 being blocked off, with the result that the wheel brakes 103a, 103b, 103c, 103d can be pressurised directly by the pump 110. If the pressure reservoir 111 is blocked off, the pump does not deliver any brake fluid into the pressure reservoir 111 during brake actuation, with the result that a more rapid pressure build-up can take place in the wheel brakes 103a, 103b, 103c, 103d. This mode of braking is referred to hereinafter as "supercharging" and is the subject of our earlier International Application PCT/GB97/01159.

With such a system, provision has to be made to prevent the pressure at the brakes becoming too high in the event of direct connection to the pump. The pressure can be controlled by switching off the pump (and on again if necessary) or by leaving the pump running continuously and controlling its delivery pressure by using a valve to spill excess fluid to the storage tank.

In communication with each wheel brake 103a, 103b, 103c, 103d are respective pressure sensors 115a, 115b, 115c, 115d, connected to the electronic control unit (ECU). The electronic control unit (ECU) is adapted to use the signals from these sensors and the wheel speed sensors 130a, 130b, 103c, 130d to determine if vehicle dynamic intervention is active. For example, in the system shown in FIG. 1, under normal conditions (base-braking) the pressure at 103a will be equal to that at 103b and the pressure at 103c will be the same as that at 103d. When vehicle dynamic intervention is active, shut-off valves 112, 113 are closed, isolating each brake 103a, 103b, 103c, 103d from the others and thus the pressure at each brake will be different from the pressure at the others.

Thus, in the case of a vehicle not having brake-apportioning between the axles, all four brake pressure demands at the four wheels will always be equal and a detection of this condition at the ECU will indicate that the vehicle dynamic functions are inactive. On the other hand a detection of non-equality, except transiently, between these four brake pressure demands indicates that one or more of the vehicle dynamic functions is active. In the case of a vehicle which does have brake apportioning between the axles, it is necessary to compare pressures across each axle. In base braking, the pressure demands for both front wheels will be the same and those for the rear axle will also be the same. However, when one or more of the vehicle dynamic functions is active, the demands across each axle will normally be different and will only coincidentally transiently be the same.

Therefore, the ECU can deduce which mode of operation the system is in, ie whether or not any vehicle dynamic intervention is active, simply by comparing the pressures at the brakes 103a, 103b, 103c, 103d and/or evaluating the wheel speed behaviour.

This provides a simple and reliable way of detecting the fluid consumption requirement of the system and therefore of selecting the best speed at which to run the pump—slow for quiet operation during normal braking and fast to cope with high fluid consumption during vehicle dynamic functions.

Figure 2:
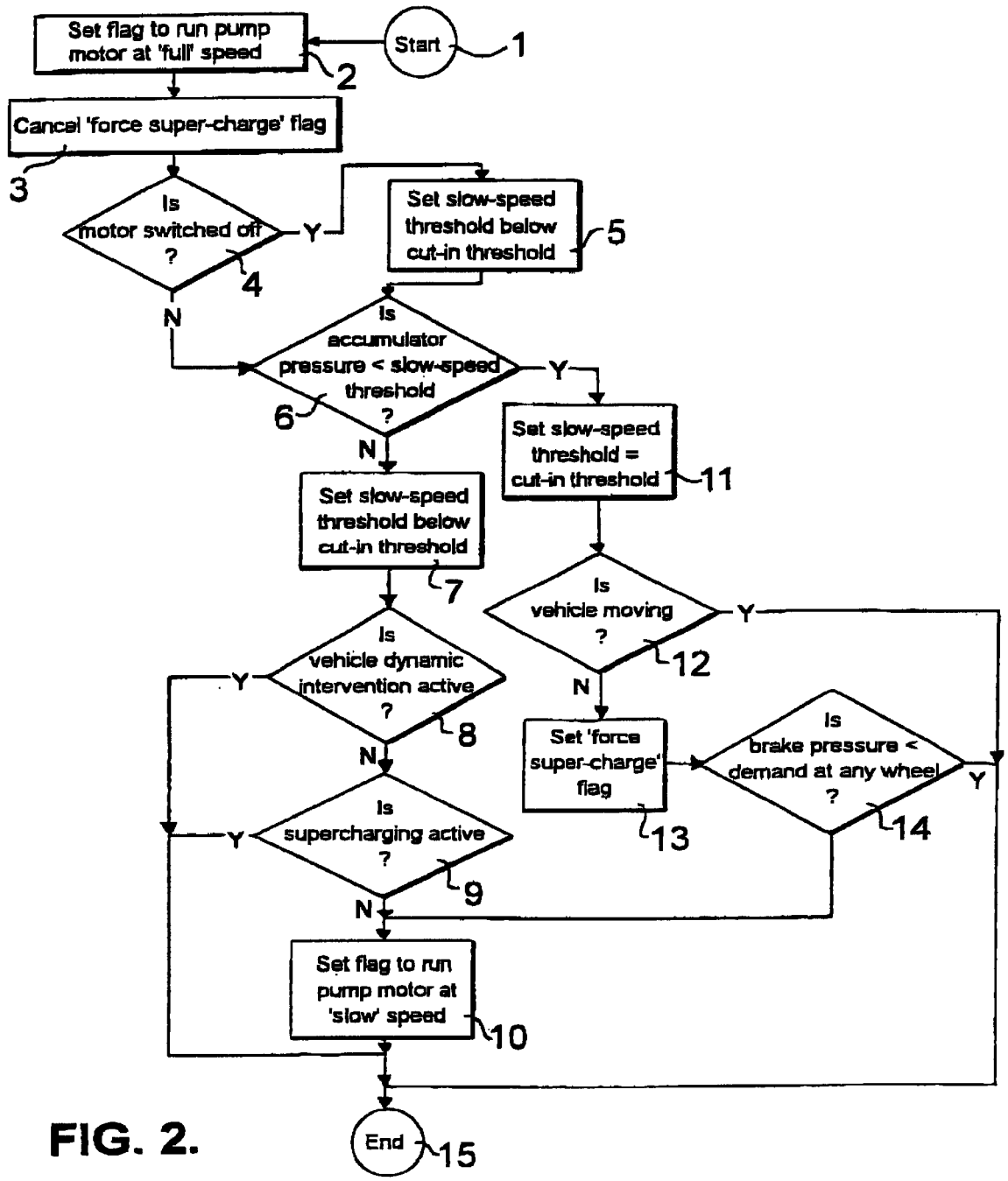
FIG. 2 is a flow diagram showing the decision process in one embodiment of a system in accordance with the present invention.

Referring now to FIG. 2, the flow chart shows the sequence steps of one possible algorithm for controlling the pump motor speed in a system according to the present invention.

The individual boxes in FIG. 2 are as follows:
1—Start.
2—Set flag to run pump motor at "fill" speed.
3—Cancel "force super-charge" flag.
4—Is motor switched off?
5—Set slow-speed threshold below cut-in threshold.
6—Is accumulator press<slow-speed threshold?
7—Set slow-speed threshold below cut-in threshold.
8—Is vehicle dynamic intervention active?
9—Is supercharging active?
10—Set flag to run pump motor at "slow" speed.
11—Set slow-speed threshold=cut-in threshold.
12—Is vehicle moving?
13—Set "force super-charge" flag.
14—Is brake pressure<demand at any wheel?
15—End.

The pump motor speed control algorithm starts at 1. As a default, flags 2, 3 are set such that the pump motor is set to run at "fall" speed (flag 2) and that supercharge is not activated (flag 3). The route followed through the rest of the algorithm sequence steps depends on conditions as follows:

1. High accumulator pressure.

The accumulator pressure as measured by the sensor 122 is compared at step 6 with a second threshold, referred to herein as the "slow-speed minimum threshold". When the pressure is greater than this threshold and the presence of vehicle dynamic intervention is detected at step 8 as described earlier, the control algorithm is completed, the pump remaining at high speed. When no vehicle dynamic intervention is detected at step 8, a flag is set at step 10 to run the pump motor at "reduced" speed. The algorithm then terminates at 15 and is repeated once per system control cycle, the pump motor speed and supercharge flags being read and actioned in a separate loop (not shown).

2. Low pressure, with vehicle stationary.

When the accumulator pressure is lower than the slow-speed minimum threshold as measured in step 6, a test is made at step 12 to see if the vehicle is moving. This can be effected in a conventional manner using information from the wheel speed sensors. If it is not moving, a flag is set at step 13 to force the supercharge function to be activated. Brake pressure is then compared with demand at the wheels in step 14. If brake pressure is equal to or exceeds demand at all of the wheels, then the flag 10 is set to run the pump motor at "reduced" speed, before the algorithm terminates. Otherwise, the algorithm terminates without adjusting the pump motor speed.

3. Low pressure with vehicle moving.

If the accumulator pressure is found at step 6 to be low and the vehicle is found at step 12 to be moving, the algorithm terminates without adjusting the motor speed.

The logic of the sequence diagram of FIG. 2 is intended to ensure that the hydraulic pump operates slowly, and therefore quietly, under most conditions. However, since vehicle dynamics operation is expected to require high fluid flow rates, so the pump speed is increased proactively in this condition.

To ensure sufficient reserve volume in the accumulator, the pump speed is also increased while the accumulator pressure is below the predetermined "slow-speed" minimum threshold" level. This threshold is set above the conventional low-pressure warning threshold but offset below the conventional cut-in threshold so that normal brake applications from accumulator pressures just above the cut-in level do not trigger unwanted pump noise when the pump starts. These precautions ensure that if the driver presses the pedal repeatedly to high demand levels, such as in cadence braking, the pump will be switched to fall speed before the warning level is reached.

Similar demand patterns can occur when the vehicle is stationary, for example during "showroom assessments" when people like to try out the brake pedal. If they do this several times with only a short time interval between such each assessment then it would normally be necessary to switch to full motor speed before the accumulator pressure falls to the level of the low-pressure warning threshold. However, it is then especially desirable to avoid high pump speeds, because the vehicle is otherwise quiet. This can be solved in the present system by using the "supercharge" mode to pressurise the brakes directly from the pump so that accumulator reserve volume is conserved and the low-pressure warning remains off. Normal accumulator powered braking can be applied as soon as the accumulator pressure exceeds the slow-speed minimum threshold or if the vehicle begins to move.

Whenever the brake pressure fulfils the driver demand, supercharging can take place at a low motor speed. For situations where the brake pressure is significantly less than the driver's demand, the pump will be switched to full speed so as to provide an acceptable response time, e.g. when holding the car on a hill. Normal accumulator-powered braking will be restored as soon as the car starts to move or whenever the accumulator pressure comes back into the normal range.

Figure 3:
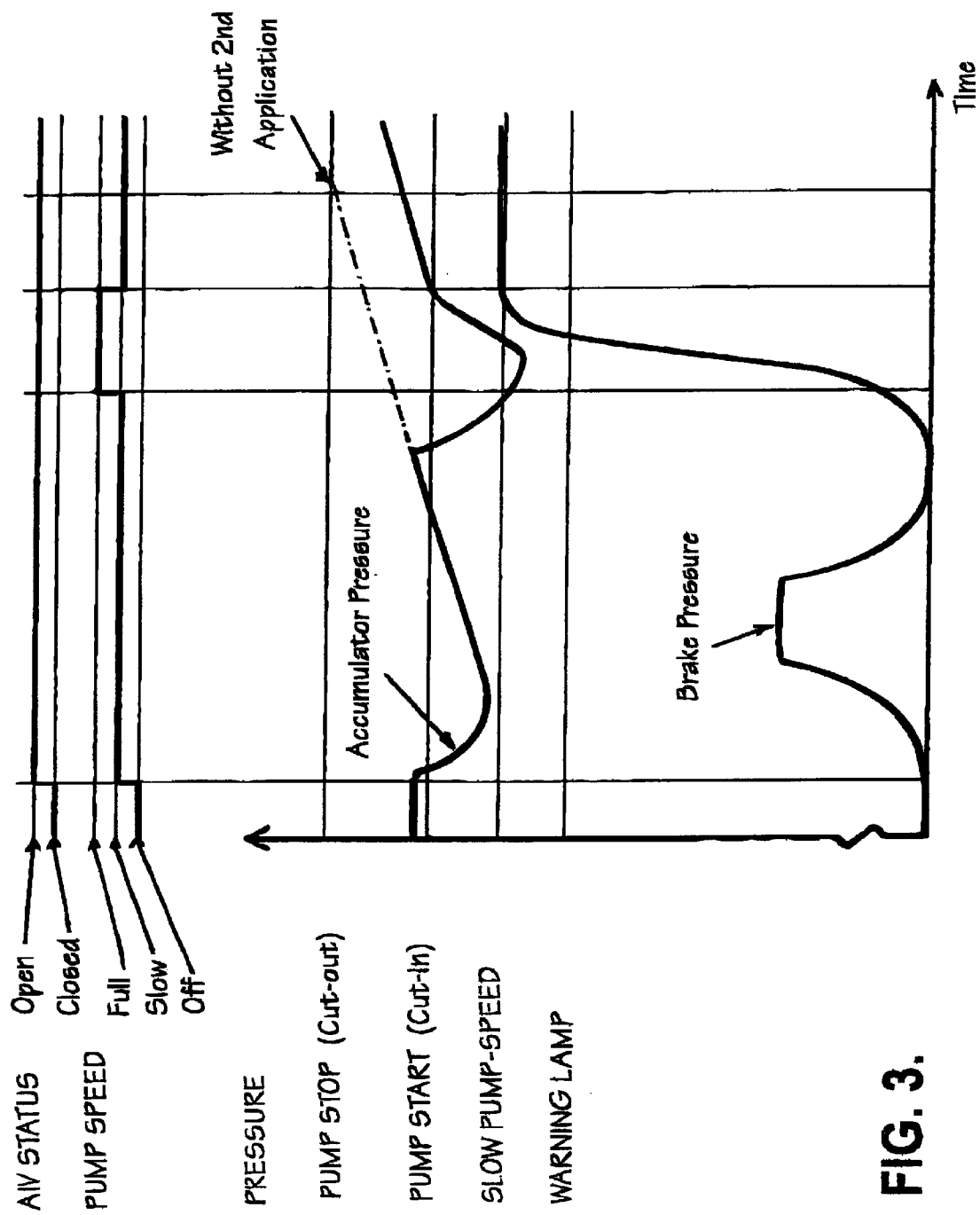
FIGS. 3 and 4 are graphical illustrations of two embodiments in accordance with the invention.
Figure 4:
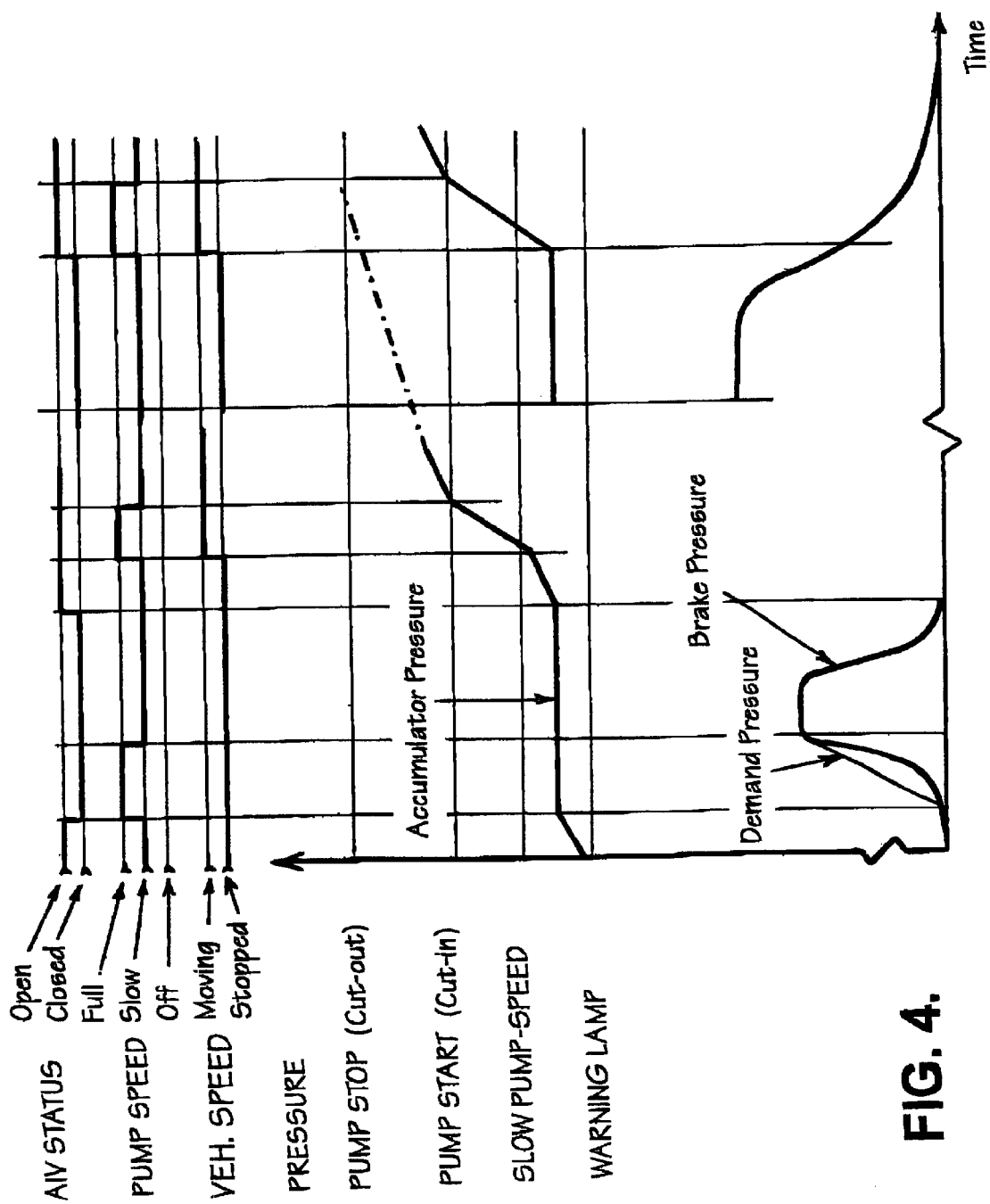

Reference is now made to FIGS. 3 and 4 which illustrates two different aspects of the control sequence shown in FIG. 2.

FIGS. 3 and 4 illustrate the timing course of the accommodated pressure in dependence upon the AIV status (open/closed) and the pump speed (full/slow/off). AIV status is the condition of the accumulator isolation valve (valve 120 in FIG. 1). These figures make clear the meaning of the four characteristic accumulator pressures, namely:

Cut-off pressure is the maximum pressure the accumulator is designed for. If its value is reached the pump is stopped.

Cut-in pressure is the minimum pressure the accumulator and the system is designed for. If its value is reached or exceeded, the pump normally is started.

Slow-speed pressure is below the cut-in pressure. If its value is exceeded, the pump is operated on slow speed, if its value goes under, the pump is operated at full speed.

Warning pressure If the pressure is down to this value, the warning lamp is switched on.

The two different aspects of the control sequence illustrated by FIGS. 3 and 4 are as follows:

1. Pressure-conscious speed switching (FIG. 3)

FIG. 3 shows two brake applications, each from an initial accumulator pressure only slightly above the cut-in pressure. In the case of the first application the pump is not running at the beginning of the application but starts at slow speed when the accumulator pressure falls below the cut-in threshold as fluid drawn from the accumulator fills the brakes. Because the brake pressure remains relatively low and the rate of application is relatively slow, the accumulator pressure remains above a slow-pump-speed threshold. Had the second application not occurred the pump would continue running at slow speed until the pressure reaches the cut-out threshold.

FIG. 3 shows a second application with a short time interval, similar to that in a cadence-braking scenario. The second application is faster and to an unusually high pressure so that accumulator pressure falls further. The pump switches to full speed when the accumulator pressure reaches the "slow-speed" threshold, which is set lower than the normal cut-in threshold. It then continues to run at full speed until the cut-in pressure is reestablished before switching back to slow speed.

Thus, once the accumulator pressure has first fallen below the switching threshold, the threshold is re-set to a higher level. This ensures that the accumulator pressure returns to the normal range quickly, and also provides the necessary control hysteresis.

Setting the initial level lower Man cut-in is important because it allows the pump to run at low speed during the period needed to restore accumulator pressure following brake applications to normal pressures—as shown by the first application of FIG. 3. Had the initial level been set to the same value as the cut-in threshold then, following an application from an initial accumulator pressure just above cut-in, the pump would have started noisily at fill speed.

2. Low-Rev. Supercharging (FIG. 4)

Because the present system has the ability to supercharge, if the accumulator becomes depleted whilst the car is stationary, the supercharge function can be invoked to isolate the accumulator and provide brake fluid directly from the pump. This conserves accumulator pressure so that the warning lamp remains off. The use of a vehicle speed signal in this way is robust.

FIG. 4 shows two non-consecutive brake applications in which the vehicle is initially stationary and then moves away. In both cases the initial accumulator pressure is very low but not quite at the level needed to illuminate the warning lamp.

Before the first application, the accumulator isolation valve (AIV) is open, despite the "force supercharge" flag, because brake demand is zero. The accumulator is therefore being recharged, but the pump is running slowly because the vehicle is stationary—see flow charge FIG. 2. As the brakes are applied, the AIV is closed by the supercharge function, and the pump speed is set to "full" because the brake pressure is less than demand. This minimises response time. But this is only a momentary phase. Pump speed is reduced (a new low-rev. supercharge mode) as soon as the brake pressure fulfils the driver demand so that the process of maintaining pressure is accomplished quietly. The supercharge function ensures that accumulator reserve volume is conserved during this mode of operation. When the brakes are released, the AIV re-opens to continue recharging the accumulator, and when the vehicle begins to move the pump speed is increased. At this time pump noise should be less noticeable because the driver's attention should be elsewhere and engine noise will help to mask the pump noise.

The second example is not intended to follow immediately after the first. It differs from the first application in that the car begins to move before the brakes are fully released (as might happen for example, if the car began to roll unexpectedly on a hill due to driver inattention). In this situation, the AIV re-opens immediately to restore normal accumulator-powered braking using the conserved accumulator volume to ensure optimum response.

What is claimed is:

1. A vehicle braking system of the type in which a stored volume of fluid is used to apply the wheel brakes of the vehicle under the control of an electronic control unit, the stored volume being held in an accumulator arranged to be replenished by pumping additional working fluid using a pump driven by an electric motor, wherein if the accumulator pressure falls below a first cut-in pressure threshold the pump is started and operated at a slow speed which is lower than full speed and only if the accumulator pressure falls below a second lower pressure threshold is the pump operated at full speed, said second lower pressure threshold being lower than said first cut-in pressure threshold, and wherein once the accumulator pressure has first fallen below said second lower pressure threshold, said second threshold is re-set to a higher level.

2. The vehicle braking system according to claim 1, wherein full speed is maintained until such time as the pressure reaches said first cut-in pressure threshold, when said slow pump speed is resumed.

3. The vehicle braking system according to claim 2, wherein said resumed slow pump speed continues until a third pump-stop threshold is reached.

4. The vehicle braking system according to claim 1, wherein the running speed of the pump electrical motor is arranged to be controlled in dependence upon whether any vehicle dynamic intervention is active.

5. A vehicle braking system of the type in which a stored volume of fluid is used to apply the wheel brakes of the vehicle under the control of an electronic control unit, the stored volume being held in an accumulator arranged to be replenished by pumping additional working fluid using a pump driven by an electric motor, wherein:

(a) if the accumulator pressure falls below a first cut-in pressure threshold the pump is started and operated at a slow speed which is lower than full speed and only if the accumulator pressure falls below a second lower pressure threshold is the pump operated at full speed, said second lower pressure threshold being lower than said first cut-in pressure threshold;

(b) full pump speed being maintained until such time as the pressure reaches said first cut-in pressure threshold, when said slow pump speed is resumed;

(c) said resumed slow pump speed continuing until a third pump-stop threshold is reached; and (d) once the accumulator pressure has first fallen below said second lower pressure threshold, said second threshold is re-set to a higher level.

6. The vehicle braking system according to claim 5, wherein the running sped of the pump electrical motor is arranged to be controlled in dependence upon whether any vehicle dynamic intervention is active.

* * * * *